(12) United States Patent
Mishima et al.

(10) Patent No.: US 11,167,229 B2
(45) Date of Patent: Nov. 9, 2021

(54) GAS-LIQUID SEPARATOR

(71) Applicant: Aisin Seiki Kabushiki Kaisha, Kariya (JP)

(72) Inventors: Takashi Mishima, Toyota (JP); Naoya Tsutsui, Anjo (JP); Koichi Kashiwagi, Toyokawa (JP); Ryuta Hayami, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 238 days.

(21) Appl. No.: 16/238,564

(22) Filed: Jan. 3, 2019

(65) Prior Publication Data

US 2019/0282942 A1    Sep. 19, 2019

(30) Foreign Application Priority Data

Mar. 16, 2018    (JP) .............................. JP2018-049621

(51) Int. Cl.
| | | |
|---|---|---|
| *B01D 45/10* | (2006.01) | |
| *B01D 45/08* | (2006.01) | |
| *H01M 8/04119* | (2016.01) | |
| *B01D 36/00* | (2006.01) | |
| *H01M 8/1018* | (2016.01) | |
| *B01D 35/027* | (2006.01) | |

(52) U.S. Cl.
CPC ........... *B01D 45/10* (2013.01); *B01D 36/001* (2013.01); *B01D 36/006* (2013.01); *B01D 45/08* (2013.01); *H01M 8/04164* (2013.01)

(58) Field of Classification Search
CPC ...... B01D 45/10; B01D 45/08; B01D 36/006; B01D 36/001; B01D 35/0273; H01M 8/04164; H01M 2008/1095; Y02E 60/50
See application file for complete search history.

(56) References Cited

U.S. PATENT DOCUMENTS

| | | | | |
|---|---|---|---|---|
| 2014/0165512 A1* | 6/2014 | Horiuchi | ................ | B01D 45/08 |
| | | | | 55/322 |
| 2015/0107198 A1* | 4/2015 | Yamaura | ................... | F01N 3/02 |
| | | | | 55/385.3 |

FOREIGN PATENT DOCUMENTS

| | | |
|---|---|---|
| JP | 2002-373699 | 12/2002 |
| JP | 4902910 | 3/2012 |
| JP | 2016-72183 | 5/2016 |
| JP | 2017-147159 | 8/2017 |

OTHER PUBLICATIONS

Machine Translation of JP 2017-147159A (obtained from JPO 10-2020) (Year: 2017).*

* cited by examiner

*Primary Examiner* — Lucas A Stelling
*Assistant Examiner* — Hafiz Muhammad Aamir
(74) *Attorney, Agent, or Firm* — Oblon, McClelland, Maier & Neustadt, L.L.P.

(57) ABSTRACT

A gas-liquid separator includes: a housing including a gas inlet, a gas outlet, and a water storage section at a lower side of the gas inlet and the gas outlet; a collision wall provided inside the housing to collide with a gas that contains water introduced from the gas inlet to separate the water from the gas by adhering the water thereto while changing a flow direction of the gas; and a downflow wall provided inside the housing to introduce the water falling from the collision wall into the water storage section and change the flow direction of the gas.

11 Claims, 4 Drawing Sheets

GAS-LIQUID SEPARATOR

CROSS REFERENCE TO RELATED APPLICATIONS

This application is based on and claims priority under 35 U.S.C. § 119 to Japanese Patent Application 2018-049621, filed on Mar. 16, 2018, the entire contents of which are incorporated herein by reference.

TECHNICAL FIELD

This disclosure relates to a technique about a gas-liquid separator that is used for separating water from a gas discharged from, for example, an anode of a fuel cell.

BACKGROUND DISCUSSION

As a gas-liquid separator having the above-described configuration, JP 2002-373699 A (Reference 1) discloses a technique about a gas-liquid separator which includes an inlet pipe provided in the upper portion of a cylindrical body unit, a water storage tank section provided in the lower portion of the body unit, an outlet pipe provided to discharge water from the water storage tank section, and a plurality of ribs provided on the bottom portion of the water storage tank section to apply resistance to the movement of water.

In Reference 1, the posture of the inlet pipe is set so as to supply a gas to the body unit in a tangential direction, the outlet pipe is provided at a central position of the upper surface of the body unit, and a funnel-shaped drop plate is disposed inside the body unit.

In Reference 1, the gas-liquid separator is configured so as to separate an exhaust gas introduced from the inlet pipe into a gas and water by the cyclone effect in the body unit, to drop the water from an opening in the drop plate to the water storage tank section, and to discharge the gas from the outlet pipe.

In addition, as a gas-liquid separator having the above-described configuration, JP 2017-147159 A (Reference 2) discloses a technique about a gas-liquid separator in which a gas-liquid separator body is configured to have a water storage section in the lower portion thereof and the gas-liquid separator body is provided with an inlet and an outlet at positions higher than the water storage section.

In Reference 2, inside the gas-liquid separator body, a collision wall having a vertical wall shape is provided at an intermediate position between the inlet and the outlet, and a rebound reduction plate is provided at the upper side of the water storage section. From this configuration, when a gas introduced from the inlet collides with the collision wall, water is separated from the gas. The separated water is stored in the water storage section, and the gas after the water has been separated by collision with the collision wall is discharged from the outlet.

A polymer electrolyte fuel cell has a configuration in which an anode and a cathode, which are formed of conductive polynomial materials, are disposed with an electrolyte membrane interposed therebetween. A hydrogen gas is supplied to the anode and air that contains oxygen is supplied to the cathode, whereby power is generated.

In the fuel cell having the above-described configuration, water is generated by a reaction between oxygen and hydrogen in the cathode during power generation. In addition, in order to maintain the anode in a wet state during power generation, hydrogen supplied to the anode is humidified by, for example, a humidifier.

Thus, since a gas discharged from the anode contains a mist of unreacted hydrogen and water, a gas-liquid separator is required in order to remove the water from the gas and return the unreacted hydrogen to the anode again.

Considering a configuration of the gas-liquid separator, since water is separated from a gas by the cyclone effect, the body unit requires a cylindrical shape, the posture of the inlet pipe needs to be set so as to send a gas to the inside of the body unit in a tangential direction, and it is necessary for the outlet pipe to be positioned at the center of the body unit. Thus, the technique of Reference 1 has a limitation on the overall shape of the gas-liquid separator.

In addition, the technique of Reference 2 has a limitation on arrangement since the gas-liquid separator body is provided with the inlet and the outlet at positions higher than the water storage section. In addition, in the technique of Reference 2, the rebound reduction plate is provided at a position at which it covers the water storage section to reduce rebound of water from the water storage section. The rebound reduction plate has a plurality of through-holes so as to enable water separated from a gas to move to the water storage section and reduce rebound of the water from the water storage section.

However, since the gas introduced from the inlet flows in the vicinity of the water storage section, even if the rebound reduction plate is provided, it was also expected that the water stored in the water storage section splashes up through the through-holes in the rebound reduction plate and is discharged along with the gas when the gas flows over the rebound reduction plate.

Thus, a need exists for a gas-liquid separator which is not susceptible to the drawback mentioned above.

SUMMARY

A feature of a gas-liquid separator according to an aspect of this disclosure resides in that the gas-liquid separator includes a housing including a gas inlet, a gas outlet, and a water storage section at a lower side of the gas inlet and the gas outlet; a collision wall provided inside the housing to collide with a gas that contains water introduced from the gas inlet to separate the water from the gas by adhering the water thereto while changing a flow direction of the gas; and a downflow wall provided inside the housing to introduce the water falling from the collision wall into the water storage section and change the flow direction of the gas.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be described below with reference to the drawings.

[Body Configuration]

Figure 1:
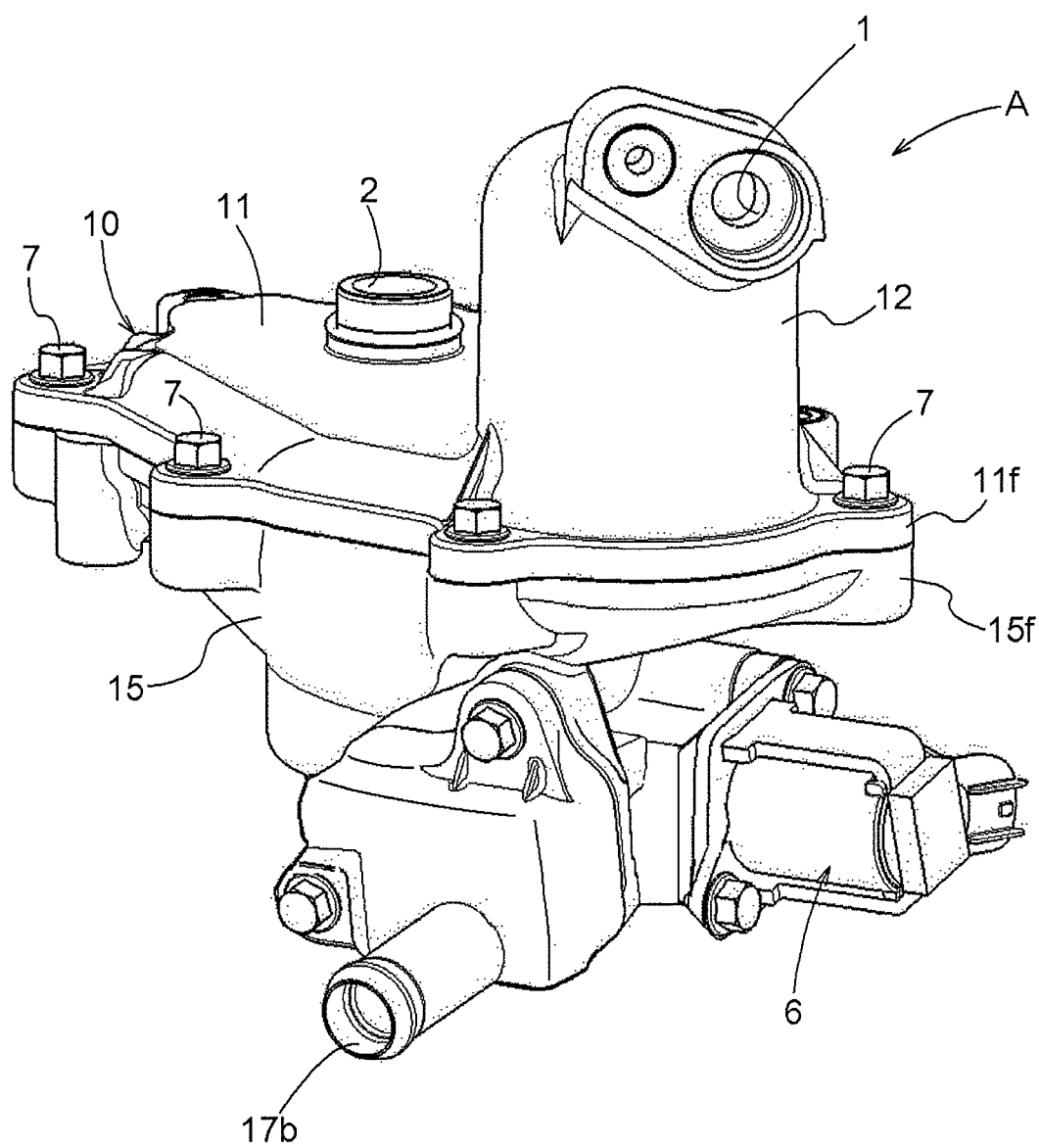
FIG. 1 is a perspective view of a gas-liquid separator.
Figure 2:
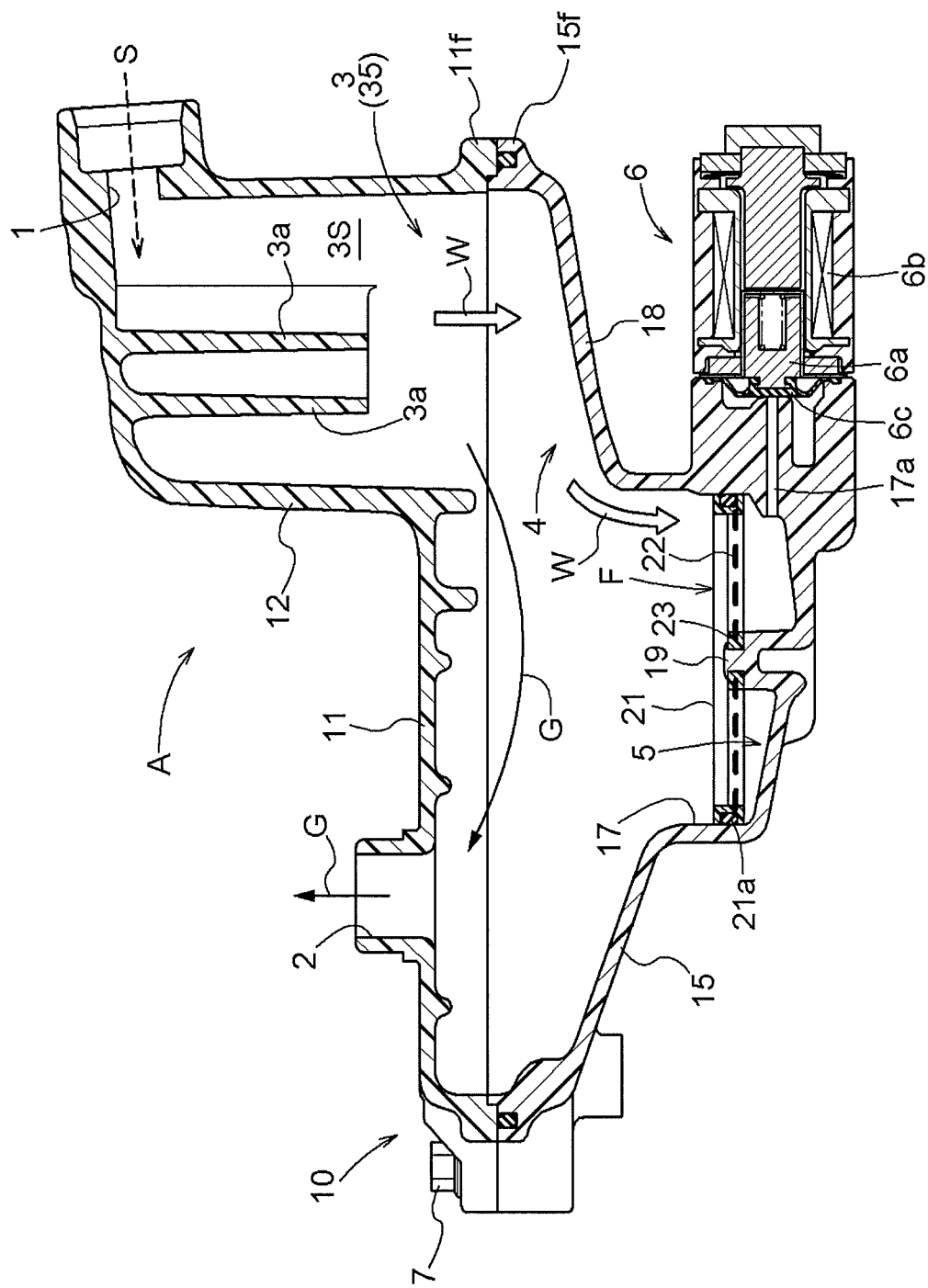
FIG. 2 is a longitudinal cross-sectional side view of the gas-liquid separator.

As illustrated in FIGS. 1 and 2, a gas-liquid separator A is configured by including a housing 10 which includes an inlet 1 for a gas that contains water (hereinafter referred to as a water-containing gas), an outlet 2 for the water-containing gas, a gas-liquid separating section 3, a downflow guiding section 4, and a water storage section 5, and an electromagnetic opening and closing valve 6 which performs discharge of water stored in the water storage section 5.

In a vehicle that is driven with power of a polymer electrolyte fuel cell (not illustrated), the gas-liquid separator A is configured in a manner such that the water-containing gas discharged from an anode of the fuel cell is introduced to the inside of the housing 10 from the inlet 1, water is separated from the water-containing gas in the gas-liquid separating section 3 and is stored in the water storage section 5, and the gas from which the water has been separated is discharged from the outlet 2.

That is, in the polymer electrolyte fuel cell, a fuel gas in which a hydrogen gas and a nitrogen gas are mixed with each other is humidified and supplied to the anode and an oxidant gas (air that contains oxygen) is supplied to a cathode, whereby power generation is performed. The reason for humidifying the fuel gas is to wet the anode, and the gas (water-containing gas) discharged from the anode contains the nitrogen gas, unreacted hydrogen gas, and water.

For this reason, this type of vehicle includes the gas-liquid separator A in a reduction path, which separates water from the water-containing gas discharged from the anode to store the water in the water storage section 5 and also returns the gas from which the water has been separated to the anode of the fuel cell.

In the fuel cell having the above-described configuration, since the amount of water to be stored in the water storage section 5 may be estimated from the amount of generated power, a control device such as, for example, an ECU estimates the amount of water in the water storage section 5 based on the amount of generated power. The control device controls the electromagnetic opening and closing valve 6 based on this estimation to perform discharge of water under control. In addition, the gas-liquid separator A may include a sensor which detects the amount of water stored in the water storage section 5 and may be configured so as to open the electromagnetic opening and closing valve 6 based on the detection result of the sensor.

[Housing]

As illustrated in FIGS. 1 and 2, the gas-liquid separator A is provided in the vehicle in a posture having a set vertical relationship. The housing 10 includes an upper housing 11 and a lower housing 15 and defines an internal space by bonding an upper flange 11f of the upper housing 11 and a lower flange 15f of the lower housing 15 using a plurality of bolts 7. In addition, the housing 10 has a structure in which the inlet 1 and the outlet 2 communicate with the internal space and a discharge flow-path 17a communicates with the water storage section 5.

The upper housing 11 and the lower housing 15 are formed of a resin, and a sealing material is sandwiched in an interface between the upper flange 11f and the lower flange 15f. In addition, the upper housing 11 and the lower housing 15 may be formed of a metal such as, for example, aluminum.

The upper housing 11 is formed with the inlet 1 and the outlet 2 with the water storage section 5 interposed therebetween in a plan view, and the outlet 2 is formed so as to penetrate the upper housing 11 in the vertical direction. In addition, the upper housing 11 is integrally formed with a bulging wall 12 that bulges upward, and a separation space 3S is formed inside the bulging wall 12. In addition, the inlet 1 is formed in the upper end portion of the bulging wall 12, and the gas-liquid separating section 3 is located in the separation space 3S inside the bulging wall 12.

Figure 3:
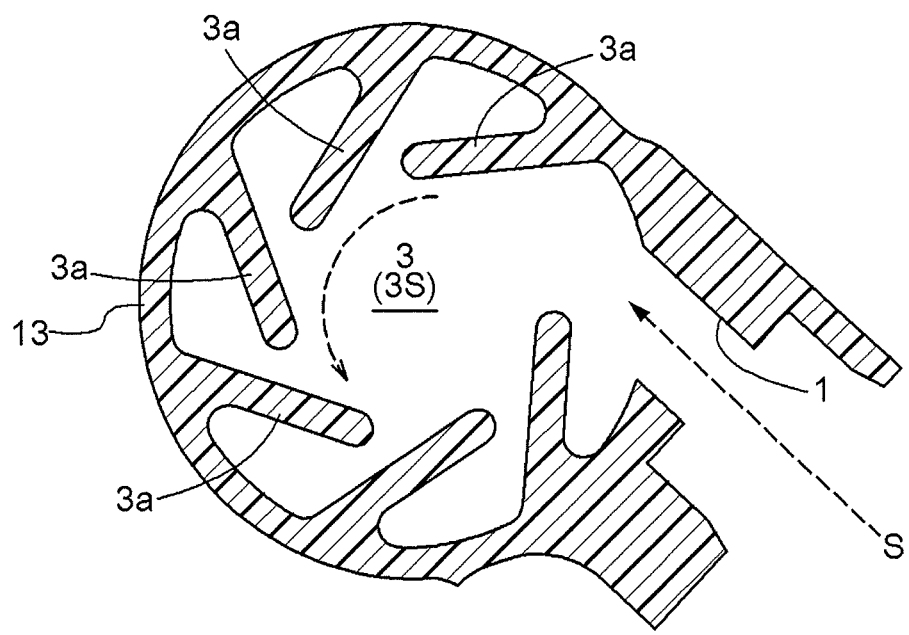
FIG. 3 is a transverse cross-sectional plan view of a portion of a bulging wall which includes an inlet.
Figure 4:
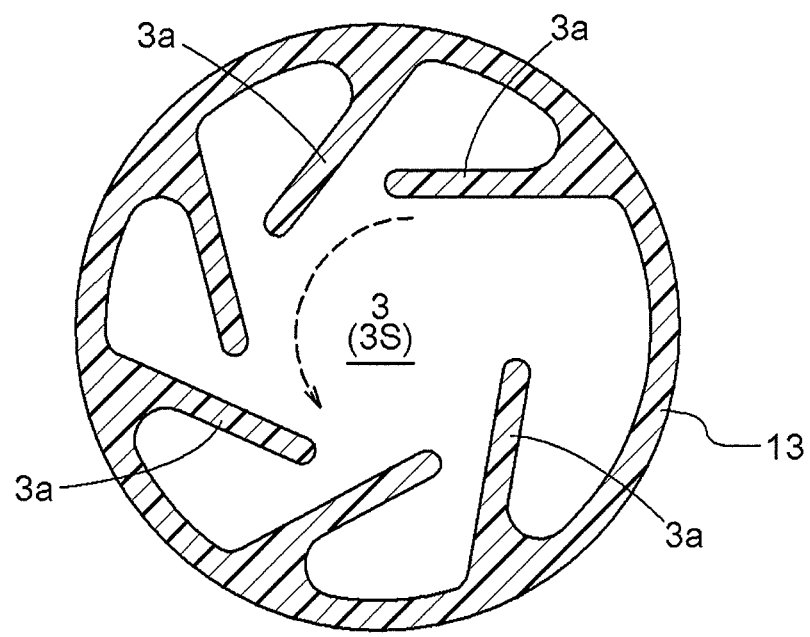
FIG. 4 is a transverse cross-sectional plan view of an intermediate portion of the bulging wall.

As illustrated in FIGS. 2 to 4, since the bulging wall 12 has an inner wall which is circular in a plan view, the separation space 3S is formed as a columnar space. The gas-liquid separating section 3 is integrally formed with a plurality of (six in the drawing) collision walls 3a along the inner wall of the bulging wall 12. The gas-liquid separating section 3 separates water contained in the water-containing gas in a state of adhering to the collision walls 3a as water droplets by colliding the water-containing gas supplied from the inlet 1 with the plurality of collision walls 3a, and also drops the separated water as water droplets downward from the collision walls 3a.

The height of the inlet 1 is set to the vicinity of the upper end of the plurality of collision walls 3a wherein each of the plurality of collision walls 3a extends from the inner wall along a respective line that intersects another of the plurality of collision walls. The introduction posture of the inlet 1 is set to send the water-containing gas in a tangential direction along the inner periphery of the separation space 3S as illustrated in FIG. 3 and then obliquely downward as illustrated in FIG. 2. Therefore, when the water-containing gas is introduced in the direction indicated by arrows as an introduction path S in FIGS. 2 and 3, a swirl flow is created to swirl in the separation space 3S inside an introduction cylinder body 13 (swirl in the counterclockwise direction in FIGS. 3 and 4), and this swirl flow moves downward while swirling. In addition, since the performance of separating water is increased by setting the inlet Ito a position higher than the plurality of collision walls 3a, the inlet 1 may be set to a position higher than the position illustrated in FIG. 2.

As a specific configuration, in the gas-liquid separating section 3, a positional relationship between the introduction direction of the introduction path S of the inlet 1 and the collision walls 3a is set so that the water-containing gas supplied from the inlet 1 to the separation space 3S first collides with one of the plurality of collision walls 3a and that the gas inlet and the plurality of collision walls 3a are arranged to create the swirl flow in a tangential direction and a downward direction with reference to the inner wall. In addition, the angles of the plurality of collision walls 3a are set so that the collided water-containing gas flows toward the adjacent collision wall 3a. Therefore, the water-containing gas supplied from the inlet 1 to the separation space 3S changes in the flow direction by sequentially colliding with the plurality of collision walls 3a, and creates a swirl flow that swirls in the separation space 3S.

Accordingly, when the water-containing gas is supplied to the separation space 3S from the inlet 1, the water contained in the water-containing gas forms into water droplets and adheres to the collision walls 3a whenever the water-containing gas collides with the collision walls 3a. In addition, as the flow of the water-containing gas is disturbed and the flow rate thereof decreases, an extremely small amount of water contained in the water-containing gas is also separated. As a result, the water droplets fall downward as indicated by arrows as a water path W in FIG. 2 and flows from the downflow guiding section 4 to the water storage section 5, and the gas from which the water droplets have been separated flows in the direction from the lower region of the separation space 3S toward the outlet 2 as indicated by arrows as a gas flow G in FIG. 2 and is discharged upward from the outlet 2.

The lower housing 15 includes a bottomed tubular water storage section wall 17 which extends downward from a central portion thereof. In addition, the lower housing 15 is formed at the lower side of the separation space 3S with a downflow wall 18 (a concrete configuration of the downflow guiding section 4) having a posture in which a portion thereof closer to the water storage section wall 17 is further downwardly inclined.

The water storage section 5 is formed in a space that is surrounded by the water storage section wall 17 and is opened upward, and the electromagnetic opening and closing valve 6 is provided on the outer surface of the lower portion of the water storage section wall 17. In addition, a filtration unit F is provided in the upper portion of the water storage section 5 to remove foreign substances contained in the water.

As illustrated in FIG. 2, the discharge flow-path 17a is formed in the water storage section wall 17. The electromagnetic opening and closing valve 6 is configured by including a valve body 6a which is held at a position at which it closes the discharge flow-path 17a by a spring biasing force and an electromagnetic solenoid 6b which opens the valve body 6a against the spring biasing force via electrical conduction. The discharge flow-path 17a communicates with a drainage port 17b illustrated in FIG. 1, and the water in the water storage section 5 is discharged from the drainage port 17b when the electromagnetic opening and closing valve 6 is opened.

Figure 6:
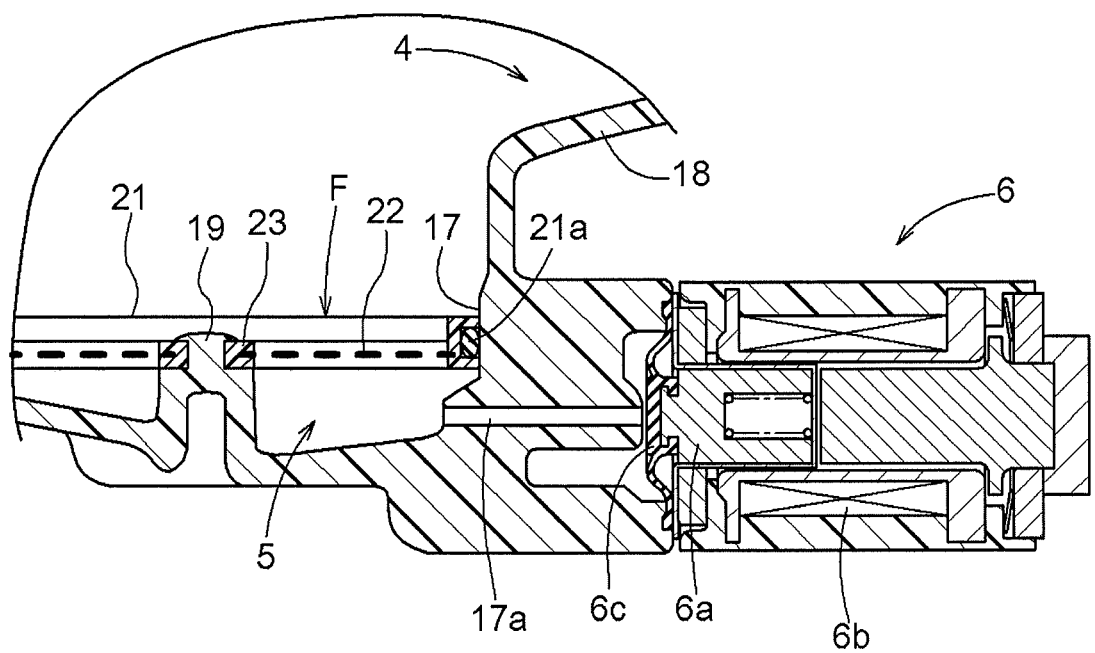
FIG. 6 is an enlarged cross-sectional view of a portion of an electromagnetic opening and closing valve in a state where a valve body is opened.

In addition, the valve body 6a of the electromagnetic opening and closing valve 6 is provided with a sealing film 6c which is formed of a resin to flexibly deform on a portion thereof which is in contact with the water storage section wall 17. When the valve body 6a is at the closed position illustrated in FIG. 2, the sealing film 6c comes into contact with the discharge flow-path 17a so as to close the discharge flow-path 17a. In addition, the sealing film 6c is configured so as to be spaced apart from the discharge flow-path 17a as illustrated in FIG. 6 in accordance with an operation of the valve body 6a when the electromagnetic solenoid 6b is driven.

Figure 5:
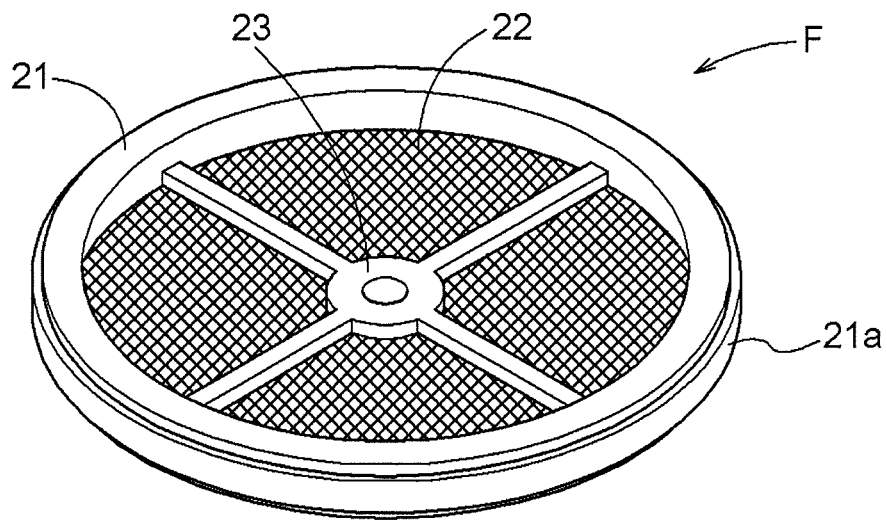
FIG. 5 is a perspective view of a filtration unit.

As illustrated in FIGS. 2 and 5, the filtration unit F is configured by including an annular resin frame 21 which is fitted into the water storage section wall 17, a filter 22 which is provided on the inner periphery of the annular frame 21 and is formed of a net member using a metal wire or nylon, and a resin fixing ring 23 which is disposed in the central region of the filter 22. In addition, a ring-shaped seal 21a is fitted into an annular groove in the outer periphery of the annular frame 21.

The annular frame 21 is circular in a plan view, the fixing ring 23 is disposed in the central region of the annular frame 21 and has a through-hole in a core thereof coaxial with the annular frame 21, and the filter 22 is provided between the outer periphery of the fixing ring 23 and the annular frame 21. In addition, as an example, although not limited thereto, the filter 22 is provided by an insert when the annular frame 21 and the fixing ring 23 are molded by a mold.

In addition, a holding protrusion 19 is formed upward from the center of a bottom wall of the water storage section 5, and the filtration unit F is fixed in a state where the upper end of the holding protrusion 19 is inserted through the through-hole in the fixing ring 23 of the filtration unit F.

The filtration unit F is configured so as to reliably supply the water flowing from the downflow wall 18 to the filter 22 by bringing the seal 21a on the outer periphery of the annular frame 21 into close contact with the inner periphery of the water storage section wall 17.

[Effects of Action of Embodiment]

From this configuration, when the water-containing gas is introduced along the introduction path S from the inlet 1, the introduced water-containing gas collides with the collision wall 3a at a high position and creates a swirl flow. While the swirl flow flows in the separation space 3S, the collision position is sequentially displaced downward in a state where the water-containing gas continuously collides with the plurality of collision walls 3a, whereby the water-containing gas may repeatedly collide with the plurality of collision walls 3a and water contained in the water-containing gas may be efficiently separated.

In addition, when the water contained in the water-containing gas forms into water droplets as the water-containing gas collides with and adheres to the collision walls 3a, the water droplets fall downward along the water path W from the collision position, are stopped by the downflow wall 18 (downflow guiding section 4), and then flow along the downflow wall 18 (along the water path W) to be stored in the water storage section 5.

In this configuration, since the water forming into water droplets on the collision walls 3a does not fall directly to the water storage section 5, the phenomenon in which water splashes up from the water storage section 5 is prevented. Moreover, since the downflow wall 18 is formed in an oblique posture, water constantly flows on the upper surface of the downflow wall 18 and the water droplets falling on the downflow wall 18 come into contact with the water in a flowing state so that kinetic energy thereof is absorbed. As such, even if a spray of water is generated from the falling water droplets, this spray does not splash high. In addition, the phenomenon in which the water which has been separated from the water-containing gas and stored splashes up inside the housing may be prevented by the gas.

In addition, since the filtration unit F is provided at the upper position of the water storage section 5, it is possible to remove foreign substances in the form of particulates. In addition, since the water droplets come into contact with the filter 22 of the filtration unit F even if they fall directly into the water storage section 5, the water droplets do not come into direct contact with the water stored in the water storage section 5 and do not splash up.

Then, since the foreign substances contained in the water are removed by the filter 22, even in a configuration in which the electromagnetic opening and closing valve 6 operates the valve body 6a by driving the electromagnetic solenoid 6b, there is no problem in that the foreign substances contained in the water are caught in the valve body 6a when the valve body 6a moves from the open position to the closed position, and it is possible to properly operate the electromagnetic opening and closing valve 6.

Since the water-containing gas supplied to the separation space 3S from the inlet 1 flows as a swirl flow in the separation space 3S, the gas which has reached the separation space 3S easily flows in the horizontal direction so as to reach the outlet 2 and be discharged upward from the outlet 2. Therefore, it is possible to lower the possibility of the gas from which the water has been separated coming into contact with water by sending the gas inside the housing 10 without bringing the gas into close to the water storage section 5 and to prevent a problem in that the separated water is again contained in the gas.

In particular, as compared with a gas-liquid separator A that separates water from the water-containing gas by the cyclone effect, this configuration has no limitation on the position of the inlet 1, the position of the outlet 2, or the shape of the housing 10, and enables easy design.

Other Embodiments

This disclosure may be configured in the following manner besides the above-described embodiment (the components having the same functions as those in the embodiment are denoted by the same reference numerals as in the embodiment).

(a) As described in the embodiment, the lower end of the opening edge of the inlet 1 is located at a position higher than the upper end of the plurality of collision walls 3a. With this configuration, it is possible to further enhance the performance of separating water in the gas-liquid separating section 3.

(b) The surface of the collision walls 3a is finished to a rough surface or is formed with a plurality of protrusions. In addition, the collision walls 3a are disposed in an oblique posture that is oblique to the vertical direction. With this configuration, it is possible to disturb the flow of the water-containing gas in the separation space 3S, to increase the time of contact between the water-containing gas and the collision walls 3a, and to efficiently separate water contained in the water-containing gas.

(c) A plurality of gas-liquid separating sections 3 are provided, and the inlet 1 is formed in each gas-liquid separating section 3. Even with this configuration, it is possible to efficiently separate water from the water-containing gas. In addition, a plurality of outlets 2 may also be provided.

(d) A portion of the lower end of the collision wall 3a is configured so as to come into contact with the upper surface of the downflow wall 18 (downflow guiding section 4). With this configuration, it is possible to reduce the amount of water droplets that fall from the collision walls 3a to the downflow wall 18 and to prevent the generation of a spray of water on the downflow wall 18.

This disclosure may be applied to a gas-liquid separator that removes water contained in a gas.

A feature of a gas-liquid separator according to an aspect of this disclosure resides in that the gas-liquid separator includes a housing including a gas inlet, a gas outlet, and a water storage section at a lower side of the gas inlet and the gas outlet; a collision wall provided inside the housing to collide with a gas that contains water introduced from the gas inlet to separate the water from the gas by adhering the water thereto while changing a flow direction of the gas; and a downflow wall provided inside the housing to introduce the water falling from the collision wall into the water storage section and change the flow direction of the gas.

According to this configuration, when the gas introduced from the gas inlet collides with the collision wall, the water contained in the gas is separated and adheres to the collision wall. In addition, the adhered water falls downward from a portion of the collision wall. The fallen water flows on the downflow wall and is stored in the water storage section. In this configuration, since the water, which forms into water droplets on the collision wall, does not fall directly to the water storage section and since the flow of gas does not directly hit the water storage section, there is no phenomenon in which the water splashes up from the water storage section.

In addition, in this configuration, as compared with the cyclone type, there is no limitation, for example, in that the housing is formed in a cylindrical shape or in that the arrangement of the gas inlet and the gas outlet is determined. In addition, for example, with a configuration in which the gas after collision with the collision wall is sent to the space above the water storage section and is discharged upward from the gas outlet, it is possible to prevent water from being contained in the gas inside the housing even if the water in the water storage section is lifted, for example, due to vibrations.

Accordingly, the gas-liquid separator is configured to separate water contained in a gas from an anode and to prevent the separated water from being discharged together with the gas.

As another configuration, the downflow wall may be spaced apart from the collision wall and may be disposed vertically below the collision wall.

According to this configuration, the water which has been separated from the gas in a state of adhering to the collision wall by colliding with the collision wall falls from the portion of the collision wall to the upper surface of the downflow wall, and is introduced into the water storage section along the downflow wall. In this configuration, since water constantly flows on the upper surface of the downflow wall and since water droplets falling on the downflow wall come into contact with the water in a flowing state so that kinetic energy thereof is absorbed, even if a spray of water is generated from the falling water droplets, this spray does not splash high. In addition, the phenomenon in which the water which has been separated from the gas and stored splashes up inside the housing may be prevented by gas.

As another configuration, a position of the gas inlet and a supply direction of the gas by the gas inlet may be set so as to supply the gas obliquely from above the collision wall.

According to this configuration, the gas introduced from the gas inlet may collide with the collision wall obliquely from above the collision wall, the collided gas may flow downward, and the water separated from the gas may be sent downward. In addition, since the downwardly directed gas does not hit the water storage section by the downflow wall, it is possible to prevent the water in the water storage section from splashing up.

As another configuration, a lower end of the gas inlet may be set to a position higher than an upper end of the collision wall.

According to this configuration, it is possible to cause the gas supplied from the gas inlet to collide with a high position on the collision wall. Moreover, when the gas after collision flows downward, it is possible to bring the gas into contact with the collision wall again, and it is also possible to efficiently separate the water contained in the gas.

The above-described effects may be realized with the following configuration described below. That is, a plurality of the collision walls may be provided, and the gas that contains water supplied from the gas inlet may collide with the plurality of the collision walls. According to this, it is possible to efficiently drop the water contained in the water-containing gas as water droplets downward from the collision walls by separating the water in a state of adhering to the collision walls as water droplets.

In addition, when the collision wall creates a swirl flow in a separation space in which separation of the gas that contains water is performed and guides the swirl flow downward while causing the swirl flow to swirl, it is possible to enhance the performance of separating water and to efficiently separate the water contained in the gas.

In this case, the swirl flow may be created to swirl in the separation space by sequentially colliding with a plurality of the collision walls, and the collision wall may be configured such that a lower end thereof oblique to a vertical direction and is disposed above the downflow wall.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A gas-liquid separator comprising:
a housing including a gas inlet, a gas outlet, a gas-liquid separating section, and a water storage section at a lower side of the gas inlet and the gas outlet, the gas-liquid separating section including a bulging wall inside which a separation space is formed, the gas inlet formed at an upper end of the bulging wall;
a plurality of collision walls extending from an inner wall of the bulging wall to collide with a gas that contains water introduced from the gas inlet to separate the water from the gas by adhering the water thereto while changing a flow direction of the gas, the plurality of collision walls includes a first collision wall on which the gas from the gas inlet collides, the first collision wall extending from the inner wall along a line that intersects with an adjacent collision wall of the plurality of collision walls to create a swirl flow in the separation space in which separation of the gas that contains water is performed; and
a downflow wall provided inside the housing to introduce the water falling from the collision wall into the water storage section and change the flow direction of the gas.

2. The gas-liquid separator according to claim 1,
wherein the downflow wall is spaced apart from the plurality of collision walls and is disposed vertically below the collision walls.

3. The gas-liquid separator according to claim 1,
wherein a position of the gas inlet and a supply direction of the gas by the gas inlet are set so as to supply the gas obliquely from above the plurality of collision walls.

4. The gas-liquid separator according to claim 1,
wherein a lower end of the gas inlet is set to a position higher than an upper end of the plurality of collision walls.

5. The gas-liquid separator according to claim 1,
wherein the plurality of collision walls guides the swirl flow downward while causing the swirl flow to swirl.

6. The gas-liquid separator according to claim 5, wherein the swirl flow is created by sequentially colliding with the plurality of collision walls and swirls in the separation space.

7. The gas-liquid separator according to claim 1,
wherein the plurality of collision walls has a lower end oblique to a vertical direction of the housing, and the lower end is disposed above the downflow wall.

8. The gas-liquid separator according to claim 1,
wherein the plurality of collision walls are angled to change the flow direction of the gas via the gas sequentially colliding with the plurality of the collision walls.

9. The gas-liquid separator according to claim 1,
wherein the inner wall is circular in plan view.

10. The gas-liquid separator according to claim 1,
each of the plurality of collision walls extends from the inner wall along a respective line that intersects another of the plurality of collision walls.

11. The gas-liquid separator according to claim 1,
the gas inlet and the plurality of collision walls are arranged to create the swirl flow in a tangential direction and a downward direction with reference to the inner wall.

* * * * *